US012704732B2

(12) United States Patent
Takahashi et al.

(10) Patent No.: US 12,704,732 B2
(45) Date of Patent: Aug. 11, 2026

(54) DRIVE CONTROL SYSTEM, HEAD-MOUNTED DISPLAY, AND DRIVE CONTROL METHOD

(71) Applicant: SONY INTERACTIVE ENTERTAINMENT INC., Tokyo (JP)

(72) Inventors: Yusuke Takahashi, Kanagawa (JP); Motohiro Nishihata, Kanagawa (JP); Masashi Murata, Saitama (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/835,354

(22) PCT Filed: Feb. 20, 2023

(86) PCT No.: PCT/JP2023/006023
§ 371 (c)(1),
(2) Date: Aug. 2, 2024

(87) PCT Pub. No.: WO2023/167039
PCT Pub. Date: Sep. 7, 2023

(65) Prior Publication Data

US 2025/0138326 A1 May 1, 2025

(30) Foreign Application Priority Data

Mar. 3, 2022 (JP) ................................ 2022-032638

(51) Int. Cl.
*G02B 27/01* (2006.01)
*G06F 3/01* (2006.01)
(Continued)

(52) U.S. Cl.
CPC ......... *G02B 27/0176* (2013.01); *G06F 3/016* (2013.01); *H02K 7/06* (2013.01); *H02P 3/08* (2013.01); *G02B 2027/0178* (2013.01)

(58) Field of Classification Search
CPC ........ G02B 27/0176; G02B 2027/0178; G06F 3/016; H02K 7/06; H02P 3/08
See application file for complete search history.

(56) References Cited

U.S. PATENT DOCUMENTS 9,764,357 B2 * 9/2017 Houston ................ H02K 7/061
11,138,843 B2 * 10/2021 Karimi Eskandary ...................... G06F 1/1626
(Continued)

FOREIGN PATENT DOCUMENTS

JP 2010283908 A 12/2010
JP 2012075197 A 4/2012
(Continued)

OTHER PUBLICATIONS

International Search Report for corresponding International Application No. PCT/JP2023/006023, dated Apr. 25, 2023, pp. 1-5.

*Primary Examiner* — William Lu
(74) *Attorney, Agent, or Firm* — Kilpatrick Townsend & Stockton LLP

(57) ABSTRACT

Rotation of a DC motor (423) for vibration used for a head-mounted display (12) is stabilized.
A drive control system (100) includes a vibration section (42) including at least the DC motor (423) and provided in the HMD 12 including a display panel (38) disposed before eyes of a user when the user wears the HMD 12, and a motor control section (60) outputting a drive signal for controlling drive force that drives the vibration section (42), and the motor control section (60) outputs, in a predetermined startup period (T1), a first drive signal (DP1) causing the vibration section (42) to be driven by first drive force, and, after the startup period (T1) elapses, outputs a second drive signal (DP2) driving the vibration section (42) using second
(Continued)

drive force smaller than the first drive force and including a plurality of single pulses to be intermittently output.

20 Claims, 9 Drawing Sheets

(51) Int. Cl.
*H02K 7/06* (2006.01)
*H02P 3/08* (2006.01)

(56) References Cited

U.S. PATENT DOCUMENTS 11,728,756 B2* 8/2023 Ishitani .................. G06F 3/016 318/114
2007/0290988 A1* 12/2007 Nogami .................. G06F 3/016 345/156
2009/0039807 A1* 2/2009 Yabusaki ................ H02P 25/18 318/244
2010/0153845 A1* 6/2010 Gregorio ................ G06F 3/016 715/702
2011/0075835 A1* 3/2011 Hill ........................ G06F 3/016 340/407.1
2012/0218172 A1* 8/2012 Border ............... G02B 27/0176 345/8
2012/0232780 A1* 9/2012 Delson .................. A63F 13/285 340/407.1
2012/0326643 A1* 12/2012 Brannen .................. H02P 6/16 318/400.11
2013/0058683 A1* 3/2013 Doshida ............ G03G 15/5008 399/167
2015/0235530 A1* 8/2015 Osawa .................. G08B 21/24 340/407.1
2016/0034035 A1* 2/2016 Higashino ............... G06F 3/011 345/156
2016/0063826 A1* 3/2016 Morrell .................... G08B 6/00 340/407.1
2016/0285401 A1* 9/2016 Murata ................. H02P 25/026
2017/0250634 A1* 8/2017 Ambruson ................ H02P 6/17
2019/0163277 A1* 5/2019 Kanai ................... G06F 3/0416
2019/0227694 A1* 7/2019 Shin .................... G06F 3/04817
2019/0235628 A1* 8/2019 Lacroix ................... G06F 3/016
2019/0304267 A1* 10/2019 Kanai ................... H02P 25/032
2019/0310709 A1* 10/2019 Yamazaki ........... G06F 3/03547
2021/0034158 A1* 2/2021 Lee .......................... G08B 6/00
2021/0364054 A1* 11/2021 Sheikholeslami .... F16D 63/002
2023/0387836 A1* 11/2023 Tsai ....................... H02K 11/33

FOREIGN PATENT DOCUMENTS

WO WO-2014147946 A1 9/2014
WO WO-2015137165 A1 9/2015
WO WO-2022004421 A1 1/2022

* cited by examiner

FIG.9A

| TARGET FREQUENCY | STARTUP PERIOD [ms] |
|---|---|
| 10 | t11 |
| 15 | t12 |
| 20 | t13 |
| 25 | t14 |

FIG.9B

| AFTER CHANGE \ BEFORE CHANGE | 10 | 15 | 20 |
|---|---|---|---|
| 15 | t21 | | |
| 16 | t22 | | |
| 17 | t23 | | |
| 18 | t24 | | |
| 19 | t25 | | |
| 20 | t26 | t212 | |
| 21 | t27 | t213 | |
| 22 | t28 | t214 | |
| 23 | t29 | t215 | |
| 24 | t210 | t216 | |
| 25 | t211 | t217 | t218 |

DRIVE CONTROL SYSTEM, HEAD-MOUNTED DISPLAY, AND DRIVE CONTROL METHOD

CROSS REFERENCE TO RELATED APPLICATIONS

This application is a National Stage of International Application No. PCT/JP2023/006023 filed on Feb. 20, 2023 which claims priority from Japanese Patent Application 2022-032638, filed on Mar. 3, 2022. The contents of the above document is incorporated herein by reference in its entirety.

TECHNICAL FIELD

The present invention relates to a drive control system, a head-mounted display, and a drive control system.

BACKGROUND ART

As disclosed in PTL 1, head-mounted displays that present moving images such as game videos and movies are utilized. Utilization of a head-mounted display outspreads moving images before the eyes of a user, which allows the use to get high realistic sensation.

CITATION LIST

Patent Literature

PTL 1
PCT Patent Publication No. WO2015/137165

SUMMARY

Technical Problem

There is a demand for getting higher realistic sensation by utilizing a head-mounted display. Thus, for example, it is conceivable that a vibration motor is used to cause vibration in response to a video. Vibration motors have individual differences, and the degree of vibration may vary depending on the vibration motor mounted in the head-mounted display. Accordingly, it is conceivable that pulse width modulation (PWM) control is performed in order to adjust an error in vibration due to an individual difference. However, performing the PWM control reduces drive force supplied to the vibration motor according to a duty ratio. Depending on the orientation of the head-mounted display, the vibration motor may fail to cause desired vibration under the effect of gravitational force.

In view of the circumstances described above, an object of the present invention is to stabilize rotation of a motor for vibration used for a head-mounted display.

Solution to Problem

In order to solve the above problem, a drive control system according to the present invention includes a vibration section including at least a motor and provided in a head-mounted display including a display panel disposed before eyes of a user when the user wears the head-mounted display, and a motor control section outputting a drive signal for controlling drive force that drives the vibration section, and the motor control section outputs, in a predetermined startup period, a first drive signal causing the vibration section to be driven by first drive force, and, after the startup period elapses, outputs a second drive signal driving the vibration section using second drive force smaller than the first drive force and including a plurality of single pulses to be intermittently output.

Additionally, the head-mounted display according to the present invention is a head-mounted display including a display panel disposed before eyes of a user when the user wears the head-mounted display, the head-mounted display including a vibration section including at least a motor and a motor control section outputting a drive signal for controlling drive force that drives the vibration section, in which the motor control section outputs, in a predetermined startup period, a first drive signal causing the vibration section to be driven by first drive force, and, after the startup period elapses, outputs a second drive signal driving the vibration section using second drive force smaller than the first drive force and including a plurality of single pulses to be intermittently output.

Additionally, a drive control method according to the present invention is a drive control method of controlling drive force that drives a vibration section including at least a motor and provided in a head-mounted display including a display panel disposed before eyes of a user when the user wears the head-mounted display, the drive control method including outputting, in a predetermined startup period, a first drive signal causing the vibration section to be driven by first drive force, and after elapse of the startup period, outputting a second drive signal driving the vibration section using second drive force smaller than the first drive force and including a plurality of single pulses to be intermittently output.

BRIEF DESCRIPTION OF DRAWINGS

FIG. 9A is a diagram illustrating a table related to the target rotation frequency and a startup period at the time of activation.

FIG. 9B is a diagram illustrating a table related to the target rotation frequency and the startup period at the time of change in target rotation frequency.

DESCRIPTION OF EMBODIMENT

An embodiment of the present invention (hereinafter referred to as the present embodiment) will be described with reference to the drawings.

[Outline of General Configuration of Entertainment System 10]

Figure 1:
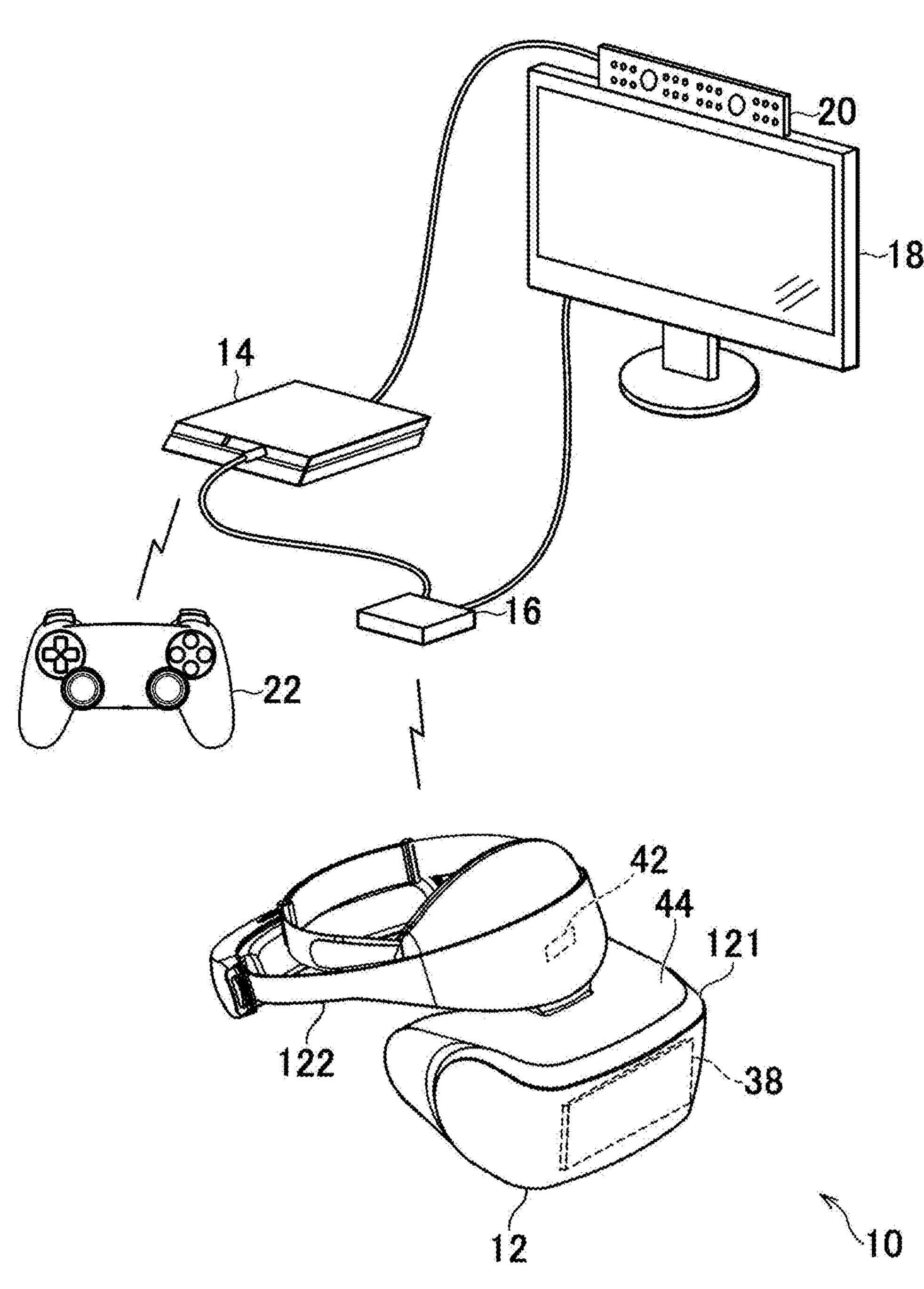
FIG. 1 is a diagram illustrating an example of a general configuration of an entertainment system according to the present embodiment.

FIG. 1 is a diagram illustrating an example of a general configuration of an entertainment system according to the present embodiment. As illustrated in FIG. 1, an entertainment system 10 according to the present embodiment may include, for example, a head-mounted display (hereinafter referred to as the HMD) 12, an entertainment apparatus 14, a relay apparatus 16, a display 18, a camera microphone unit 20, and a controller 22. Note that the general configuration of the entertainment system 10 illustrated in FIG. 1 is illustrative and that the present embodiment is not limited to this configuration and is only required to include at least the HMD 1.

[Outline of General Configuration of Entertainment Apparatus 14]

Figure 2:
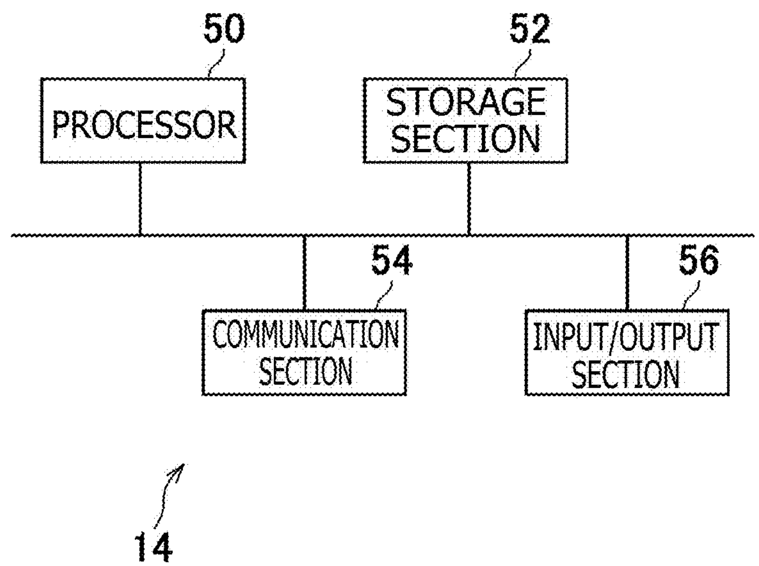
FIG. 2 is a diagram illustrating an example of a configuration of an entertainment apparatus according to the present embodiment.

FIG. 2 is a diagram illustrating an example of a configuration of the entertainment apparatus according to the present embodiment. For example, as illustrated in FIG. 2, the entertainment apparatus 14 according to the present embodiment may include a processor 50, a storage section 52, a communication section 54, and an input/output section 56.

The entertainment apparatus 14 may be, for example, a computer such as a game console, a digital versatile disc (DVD) player, or a Blu-ray (registered trademark) player. The entertainment apparatus 14 according to the present embodiment may generate videos and sounds by, for example, executing a game program or reproducing content, the game program or the content being stored or recorded in an optical disc. Then, the entertainment apparatus 14 according to the present embodiment may output, to the display 18 via the relay apparatus 16, a video signal representing a generated video and a sound signal representing a generated sound.

For example, the processor 50 may be a program control device such as a central processing unit (CPU) which operates in accordance with a program installed in the entertainment apparatus 14.

The storage section 52 may include, for example, storage elements such as a read-only memory (ROM) and a random access memory (RAM), or a hard disk drive. The storage section 52 may store programs executed by the processor 50, and the like. The communication section 54 may be, for example, a communication interface such as a wireless local area network (LAN) module. The input/output section 56 may be an input/output port such as a high-definition multimedia interface (HDMI) (registered trademark) port or a universal serial bus (USB) port.

Note that various functions included in the entertainment apparatus 14 may be those mounted in the HMD 12.

[Outline of General Configuration of HMD 12]

As illustrated in FIG. 1, the HMD 12 may include a main body 121 and a mounting band 122. The mounting band 122 may be generally annular to surround the head of the user. The main body 121 may house a display panel 38 and the like, and may include a housing 44 constituting an exterior of the display panel 38. The mounting band 122 may be connected to an upper portion of the main body 121.

Figure 3:
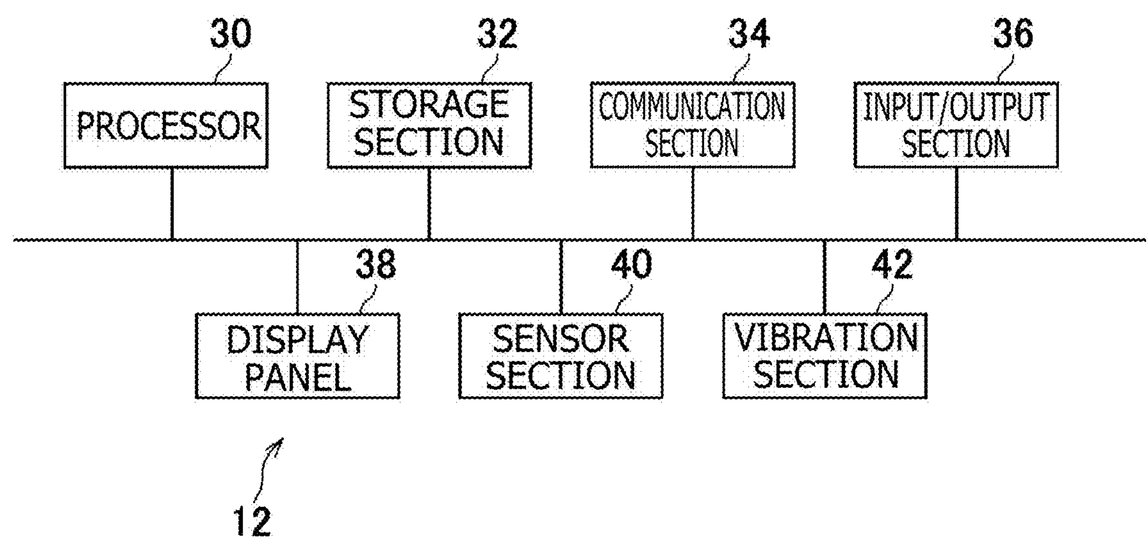
FIG. 3 is a diagram illustrating an example of a configuration of a head-mounted display according to the present embodiment.

FIG. 3 is a diagram illustrating an example of a configuration of the head-mounted display according to the present embodiment. As illustrated in FIG. 3, the HMD 12 may include a processor 30, a storage section 32, a communication section 34, an input/output section 36, the display panel 38, a sensor section 40, and a vibration section 42.

The processor 30 may be, for example, a program control device such as a microprocessor which operates in accordance with programs installed in the HMD 12. The storage section 32 may include, for example, storage elements such as a ROM and a RAM. The storage section 32 may store programs executed by the processor 30, and the like. The communication section 34 may be, for example, a communication interface such as a wireless LAN module. Note that FIG. 1 illustrates an example in which the HMD 12 can communicate with the entertainment apparatus 14 by wireless communication but that the HMD 12 may be enabled to communicate by wire. The input/output section 36 may be an input/output port such as an HDMI (registered trademark) port or a USB port.

The display panel 38 is, for example, a display such as a liquid crystal display or an organic electroluminescent (EL) display, and may be caused to display videos generated by the entertainment apparatus 14, and the like. The display panel 38 may be disposed before the eyes of a user when the user wears the HMD 12. The display panel 38 may, for example, receive a video signal output by the entertainment apparatus 14 and relayed by the relay apparatus 16, and may output the video represented by the video signal.

The display panel 38 may be adapted to, for example, display a three-dimensional image by displaying an image for the left eye and an image for the right eye. Note that the display panel 38 is not limited to a display panel displaying three-dimensional images and may be a display panel capable of displaying only two-dimensional images. The sensor section 40 may be, for example, an acceleration sensor, a motion sensor, or the like. The sensor section 40 may output measurement results such as the orientation, rotation amount, and moving distance of the HMD 12 to the processor 30.

[Configuration of Vibration Section 42]

Figure 4A:
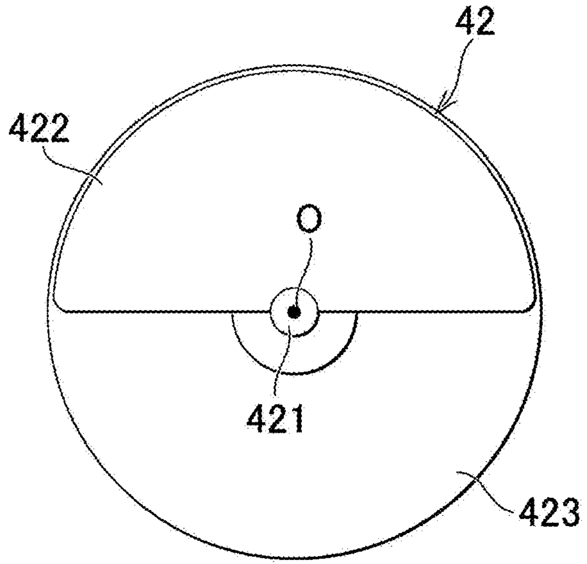
FIG. 4A is a plan view of a vibration section included in the head-mounted display according to the present embodiment, as seen from above.
Figure 4B:
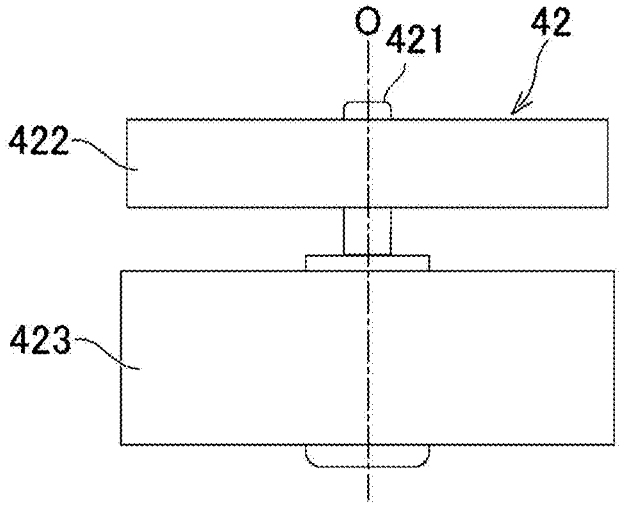
FIG. 4B is a side view of the vibration section included in the head-mounted display according to the present embodiment, as seen from the side.

Now, with reference to FIGS. 4A and 4B, a configuration of the vibration section 42 included in the HMD 12 will be described. FIG. 4A is a plan view of the vibration section included in the head-mounted display according to the present embodiment, as seen from above. FIG. 4B is a side view of the vibration section included in the head-mounted display according to the present embodiment, as seen from the side. Here, "from the side" refers to a direction perpendicular to the display panel 38.

The vibration section 42 is driven (vibrated) according to an instruction received from the entertainment apparatus 14 and an output from the sensor section 40. As illustrated in FIG. 1, the vibration section 42 may be provided, for example, in the front of the mounting band 122. Note that FIG. 1 illustrates arrangement of the vibration section 42 and schematically illustrates the shape of the vibration section 42. The vibration section 42 may be any vibration section provided in the HMD 1 in such a manner as to vibrate the HMD 1, and the arrangement of the vibration section 42 is not limited to that illustrated in FIG. 1.

The vibration section 42 may vibrate, for example, when an object or a game character operated by a user takes some action or is subjected to impact. The vibration of the vibration section 42 causes the mounting band 122 to vibrate, and the vibration of the mounting band 122 is transmitted to the head of the user. This allows the user to experience higher realistic sensation.

As illustrated in FIG. 4A and FIG. 4B, the vibration section 42 may be a vibration device constituting what is called an eccentric motor including a rotation shaft 421, a spindle 422 that rotates with the rotation shaft 421, and a DC motor 423 that rotates the rotation shaft 421. The spindle 422 may be attached to the rotation shaft 421 and have the center of gravity at a position away from the rotation shaft 421. The DC motor 423 may be a general-purpose motor including at least a coil, a rotor, and a stator.

The rotation shaft 41 may be disposed so as to extend in a direction along a display surface of the display panel 38. That is, the rotation shaft 41 may be disposed in such a manner that the axis O of the rotation shaft 41 extends in a direction substantially parallel to the display panel 38. Specifically, the rotation shaft 41 may be disposed in such a manner that the rotation shaft 41 is oriented in an up-down direction of the display panel 38. Such arrangement causes the vibration section 42 to vibrate in a direction substantially orthogonal to the up-down direction of the display panel 38.

[Outline of Drive Control System 100]

Figure 5:
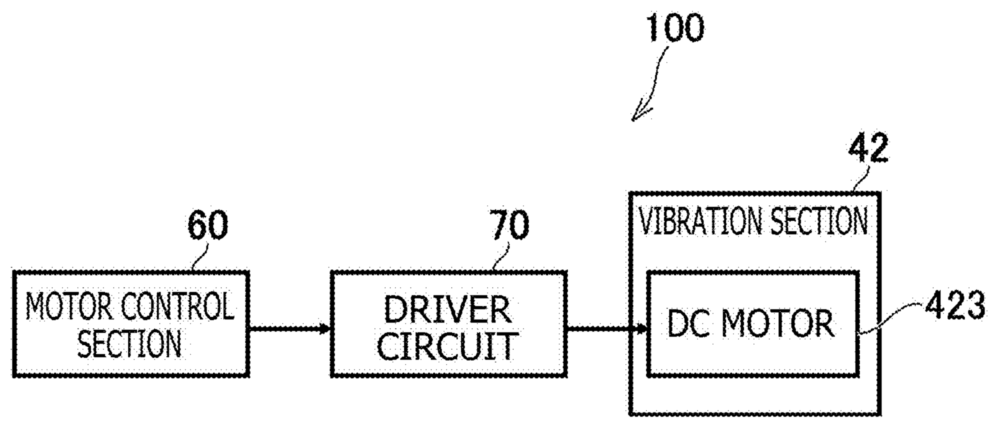
FIG. 5 is a diagram illustrating an example of a configuration of a drive control system included in the entertainment system according to the present embodiment.

FIG. 5 is a diagram illustrating an example of a configuration of a drive control system 100 included in the entertainment system according to the present embodiment. The drive control system 100 according to the present embodiment may include a motor control section 60, a driver circuit 70, and the vibration section 42.

The motor control section 60 may output a drive signal that is a pulse signal controlling drive force that is fed from the driver circuit 70 in response to a video displayed on the display panel 38 or detection by the sensor section 40 (hereinafter referred to as the video or the like). Note that the motor control section 60 is not limited to the motor control section outputting the drive signal in response to the video or the like and may be capable of outputting a drive signal independent of the video or the like. For example, the motor control section 60 may be able to output the drive signal on the basis of an input operation directed to the controller 22 and not reflected in the display on the display panel 38. The motor control section 60 may be included in the HMD 12. In that case, the motor control section 60 may be mainly implemented using the processor 30. Note that the motor control section 60 may be included in the entertainment apparatus 14 and that, in that case, the motor control section 60 may be mainly implemented using the processor 50.

The driver circuit 70 feeds, to a coil of the DC motor 423, a drive voltage corresponding to a drive signal output from the motor control section 60 to drive the DC motor 423. The driver circuit 70 includes a switch that is a transistor, or the like and may be enabled to feed the drive voltage to the DC motor 423 by turning on and off the switch in response to the drive signal output from the motor control section 60. The driver circuit 70 may be included in the HMD 12.

[Drive Control: Immediately After Start of Activation]

Figure 6:
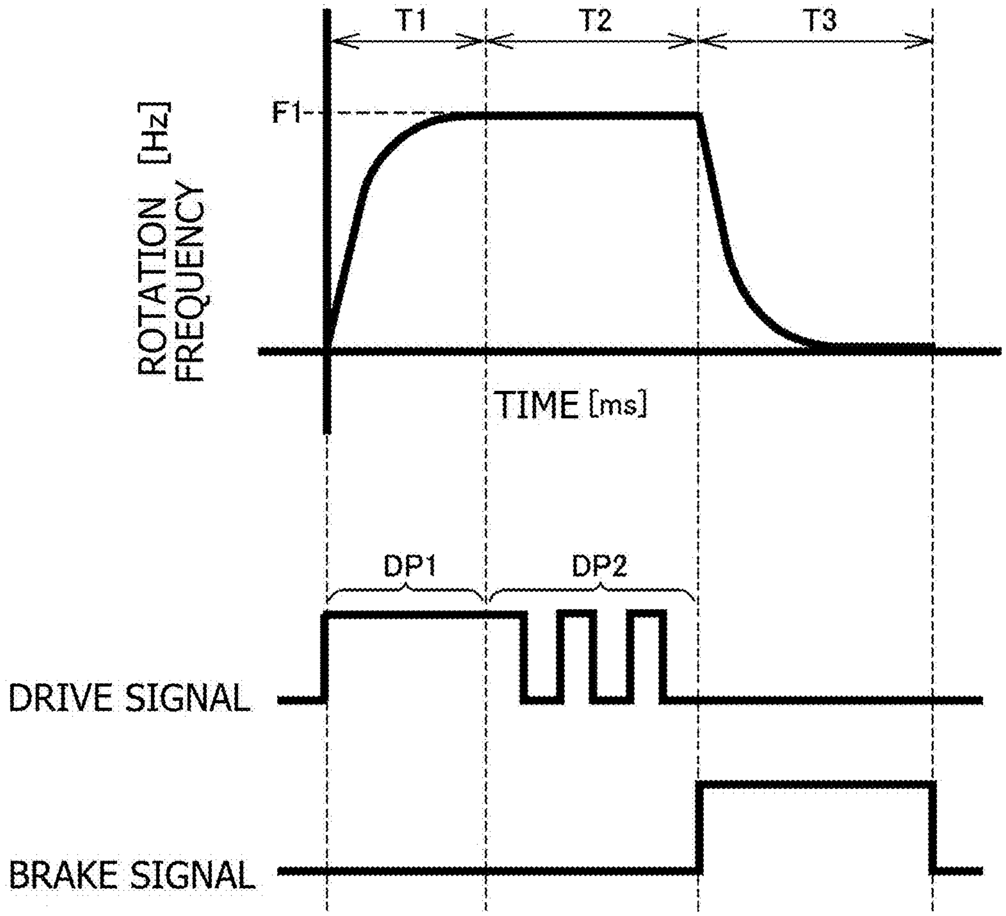
FIG. 6 is a diagram for describing drive control performed immediately after a direct current (DC) motor is activated according to the present embodiment.

Now, with reference to FIG. 6, drive control performed immediately after a direct current (DC) motor is activated according to the present embodiment will be described. FIG. 6 is a diagram describing drive control performed immediately after the DC motor is activated according to the present embodiment.

When the drive voltage is fed to the DC motor 423 included in the vibration section 42, the DC motor 423 starts rotation, and after the elapse of a predetermined period, a desired target rotation frequency is reached. Here, the DC motor 423 may have an individual difference. Specifically, for DC motors 423, even in a case where the coil of the DC motor 423 is fed with the same drive voltage, the rotation frequency may vary with each DC motor 423. Accordingly, the vibration transmitted to the head of the user may vary with each HMD 12.

Accordingly, for example, it is conceivable that PWM control is performed and each DC motor 423 is calibrated. However, the PWM control is likely to vary in the time from activation of the DC motor 423 until the target rotation frequency is reached. Additionally, in the PWM control, there is a possibility that insufficient drive force is provided immediately after the activation of the DC motor 423, preventing the DC motor 423 from operating normally. This is because the rotation shaft 421 and the spindle 422 are likely to be affected by gravitational force depending on the direction or orientation of the head of the user wearing the HMD 12. For example, in a case where the rotation shaft 421 is disposed so as to extend in a horizontal direction, the rotation shaft 421 and the spindle 422 are less likely to rotate under the effect of gravitational force.

Accordingly, in the present embodiment, a certain drive voltage (power voltage) is fed in a predetermined startup period T1 immediately after activation of the DC motor 423, and the PWM control is performed in a stable period T2 after the elapse of the startup period T1.

In the present embodiment, the startup period T1 is a predetermined period immediately after activation of the DC motor 423 in a deactivated state and before stabilization of the rotation frequency. The startup period T1 may be preset according to a target rotation frequency of the DC motor 423. The startup period T1 may be set to increase as the target rotation frequency of the DC motor 423 increases. Note that FIG. 6 illustrates an example in which the DC motor 423 has a target rotation frequency F1 [Hz]. The drive voltage fed during the startup period T1 may be set to the same value regardless of the individual difference in the DC motor 423.

The stable period T2 is a period after the elapse of the startup period T1 and when the DC motor 423 has a stable rotation frequency.

In the startup period T1, the motor control section 60 outputs a first drive signal DP1 causing the vibration section 42 to be driven by first drive force. That is, in the startup period T1, the switch included in the driver circuit 70 is always in an ON state to feed the power voltage. Compared to the PWM control, this allows the vibration section 42 to be driven by large drive force. Accordingly, regardless of the orientation of the vibration section 42, that is, regardless of the direction of the rotation shaft 421, the DC motor 423 can be rotated normally. Additionally, the period until the target rotation frequency is reached can be made constant regardless of the individual difference in the DC motor 423. Additionally, the rotation frequency of the DC motor 423 can be caused to reach the target rotation frequency in a short period of time.

In the stable period T2, the motor control section 60 performs PWM control for outputting a second drive signal DP2 causing the vibration section 42 to be driven by second drive force smaller than the first drive force. That is, in the stable period T2, the switch included in the driver circuit 70 may be alternately turned on and off at predetermined time intervals. The second drive signal DP2 is a signal including a plurality of single pulses to be intermittently output.

Here, the second drive force causing the vibration section 42 to be vibrated in the PWM control is determined according to the duty ratio of the second drive signal DP2. Here, the duty ratio indicates a ratio of single pulses output within a predetermined period. FIG. 6 indicates the second drive signal DP2 having a duty ratio of 3/6.

The duty ratio of the second drive signal DP2 may be set for each DC motor 423 according to the individual difference in the DC motor 423. For example, for DC motors tending to have a reduced rotation frequency, a higher duty ratio may be set for the second drive signal DP2.

[Drive Control: When Target Rotation Frequency is Changed]

Figure 7:
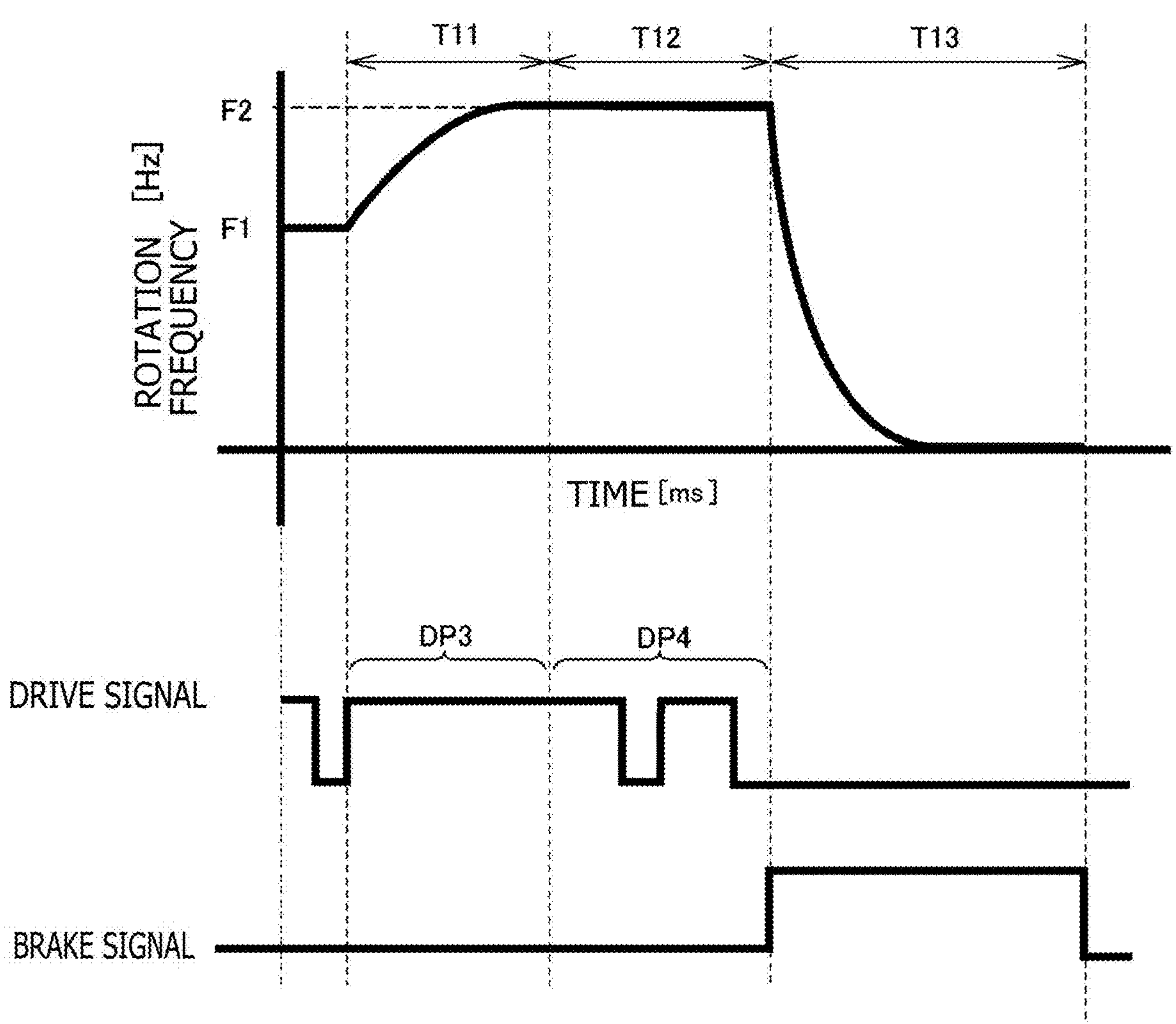
FIG. 7 is a diagram for describing drive control performed when a target rotation frequency of the DC motor is changed according to the present embodiment.

Now, with reference to FIG. 7, the drive control performed when the target rotation frequency of the DC motor is changed according to the present embodiment. FIG. 7 is a diagram for describing the drive control performed when the target rotation frequency of the DC motor is changed according to the present embodiment.

In an example in FIG. 7, in the state where the rotation frequency has reached the target rotation frequency F1 [Hz] illustrated in FIG. 6, the target rotation frequency is changed to F2 (>F1) [Hz].

In the present embodiment, the constant drive voltage (power voltage) is fed in a predetermined startup period T11 when the target rotation frequency is changed, and the PWM control is performed in a stable period T12 after the elapse of the startup period T11.

The motor control section 60 outputs a third drive signal DP3 illustrated in FIG. 7 in the startup period T11 when the target rotation frequency is changed. That is, the switch included in the driver circuit 70 is always kept in the ON state to feed the power voltage. Thus, the period until the second target rotation frequency F2 is reached can be made constant regardless of the individual difference in the DC motor 423. Additionally, the rotation frequency of the DC motor 423 can be caused to reach the changed target rotation frequency in a short time.

In the stable period T12, the motor control section 60 performs the PWM control for outputting a fourth drive signal DP4 illustrated in FIG. 7. That is, in the stable period T12, the switch included in the driver circuit 70 is alternately turned on and off at predetermined intervals. The fourth drive signal DP4 is a signal including a plurality of single pulses to be intermittently output. FIG. 7 illustrates the fourth drive signal DP4 having a duty ratio of 4/6. The duty ratio of the fourth drive signal DP4 may be set for each DC motor 423 according to the individual difference in the DC motor 423.

[Drive Control: Brake]

Stopping the feeding of the drive voltage causes the DC motor 423 to be stopped after inertly continuing rotation. In this case, the vibration section 42 requires much time before stopping vibration, preventing the vibration from being modulated.

Accordingly, the present embodiment employs a configuration in which the rotation of the DC motor 423 is forcefully and quickly stopped by the motor control section 60 outputting a brake signal in response to a video or the like. For example, the DC motor 423 may be braked by connecting the coil provided in the DC motor 423 to ground to eliminate the drive voltage, or may be electromagnetically braked by induced electromotive force generated by short-circuiting coil terminals included in the DC motor 423.

FIG. 6 illustrates an example in which the motor control section 60 outputs a brake signal in a brake period T3 after the stable period T2. Additionally, FIG. 7 illustrates an example in which the motor control section 60 outputs the brake signal in a brake period T13 after the stable period T12.

Note that the brake period T13 is not limited to the period required for the rotation of the DC motor 423 to completely stop and is only required to be the period required to reduce the rotation to the extent that the user feels no vibration.

As illustrated in FIG. 6 and FIG. 7, the vibration can be modulated by employing a configuration in which the DC motor 423 is forcefully stopped by feeding brake force to the DC motor 423 instead of waiting for the DC motor 423 to be inertly stopped. As a result, the user can experience higher realistic sensation.

[Drive Control: Delay Control Etc.]

Figure 8:
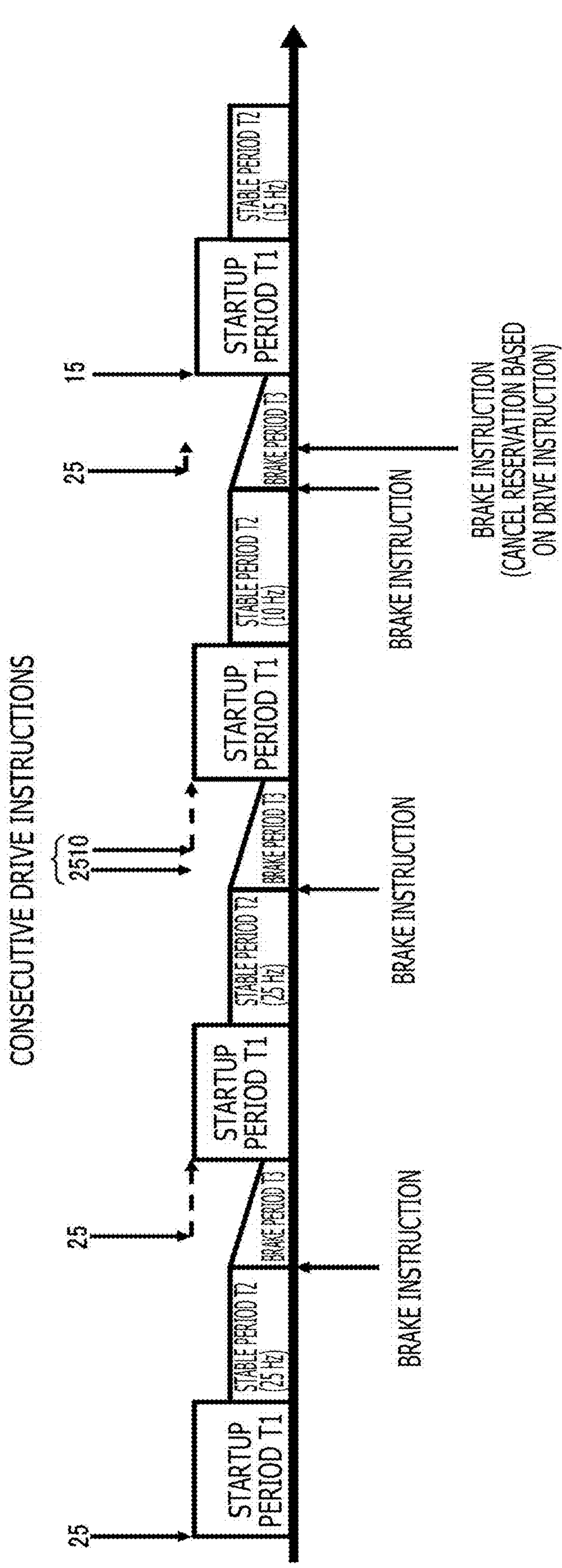
FIG. 8 is a diagram schematically illustrating an example of drive control according to the present embodiment.

Furthermore, with reference to FIG. 8, delay control etc. in the present embodiment will be described. FIG. 8 is a diagram schematically illustrating drive control according to the present embodiment. Arrows in FIG. 8 indicate output timings for drive instructions or brake instructions output in response to videos or the like display on the display panel 38. For example, an arrow illustrated with “25” indicates a timing when a drive instruction for causing output of a drive signal having a target rotation frequency of 25 [Hz] is provided.

In the present embodiment, in the brake period T3 when the brake signal is being output, the motor control section 60 is configured to be enabled to receive a drive instruction in response to a video or the like displayed on the display panel 38. Additionally, after the elapse of the brake period T3, the output of the drive signal based on the drive instruction is started. That is, instead of starting the output of the drive signal based on a drive instruction immediately after the reception of the drive instruction, the output of the drive signal based on the drive instruction is reserved. In such a manner, even in a case where the drive instruction is output in the brake period T3, a configuration is employed in which the next drive signal is output after the elapse of the brake period T3, allowing the vibration to be modulated. Additionally, reserving the next drive in advance allows the output of the next drive signal to be started immediately after the brake period T3, allowing delay in the output of the next drive signal to be suppressed. As a result, the user can experience higher realistic sensation.

Additionally, in the present embodiment, in a case where consecutive drive instructions are provided, operation based on the subsequent drive instruction is prioritized. That is, in a case of receiving a plurality of drive instructions in the brake period T3 when the brake signal is being output, the motor control section 60 outputs the next drive signal on the basis of the last received drive instruction. Specifically, as illustrated in FIG. 8, in a case of receiving a drive instruction for causing output of the drive signal having a target rotation frequency of 25 [Hz] and receiving, before the elapse of the brake period T3, a drive instruction for causing output of the drive signal having a target rotation frequency of 10 [Hz], the motor control section 60 prioritizes the output of the drive signal having a target rotation frequency of 10 [Hz].

Additionally, in the present embodiment, in a case of receiving the brake instruction after receiving the drive instruction, the motor control section 60 prioritizes the brake. That is, in a case of receiving the brake instruction after reserving the output of the next drive signal, the motor control section 60 cancels the reservation of the output of the drive signal based on the drive instruction. Thus, long continuation of vibration can be suppressed. This allows the user to be restrained from having discomfort feeling due to long continuation of vibration. Note that the brake instruction may be output at a timing after the elapse of a predetermined period after the latest output of the brake instruction regardless of the situation of the video or the like.

[Table Related to Startup Period]

Now, with reference to FIG. 9A and FIG. 9B, the relation between the target rotation frequency and the startup period will be described. FIG. 9A is a diagram illustrating a table related to the target rotation frequency and the startup period at the time of activation. FIG. 9B is a diagram illustrating a table related to the target rotation frequency and the startup period at the time of change in the target rotation frequency.

As illustrated in FIG. 9A and FIG. 9B, the present embodiment employs a configuration in which the table related to the target rotation frequency and the startup period at the time of activation and the table related to the target rotation frequency and the startup period at the time of change in the target rotation frequency are separately managed. This is because the required startup period varies between the time of startup and the time of change in the target rotation frequency despite the same target rotation frequency. That is, the startup period T1 differs from the startup period T11 despite the same target rotation frequency. Thus, separate management of the tables allows the tables to be simplified. Note that each of the tables may be, for example, stored in the storage section 32.

As described above, the startup period T1 illustrated in FIG. 6 may be preset according to the target rotation frequency. FIG. 9A illustrates an example in which in a case where the target rotation frequency is 10, 15, 20, or 25 [Hz], the startup period T1 is correspondingly t11, t12, t13, or t14 [ms]. Here, there is a relation of t11<t12<t13<t14. That is, the startup period T1 is set to increase as the target rotation frequency increases.

Additionally, the startup period T11 illustrated in FIG. 7 may be preset according to the target rotation frequency before change and the target rotation frequency after change. FIG. 9B indicates the startup period T11 in a case where the target rotation frequency before change is 10, 15, or 20 [Hz] and the target rotation frequency after change ranges from 15 to 25 [Hz] in steps of 1 [Hz]. The startup period T11 illustrated in FIG. 9B is in a relation of t21<t22< . . . <t211, t212<t213< . . . <t217.

The present embodiment does not provide the startup period T11 in a case where the difference is small between the target rotation frequency before change and the target rotation frequency after change. For example, the startup period T11 is not provided in a case where a drive instruction is output to cause a drive signal having a target rotation frequency of any of 15 to 19 [Hz] while driving is being performed by the drive instruction for causing output of the drive signal having a target rotation frequency of 15 [Hz]. Employment of such a configuration allows suppression of power consumption caused by unnecessary occurrence of the startup period T11.

[Method for Determining Duty Ratio]

Figure 10:
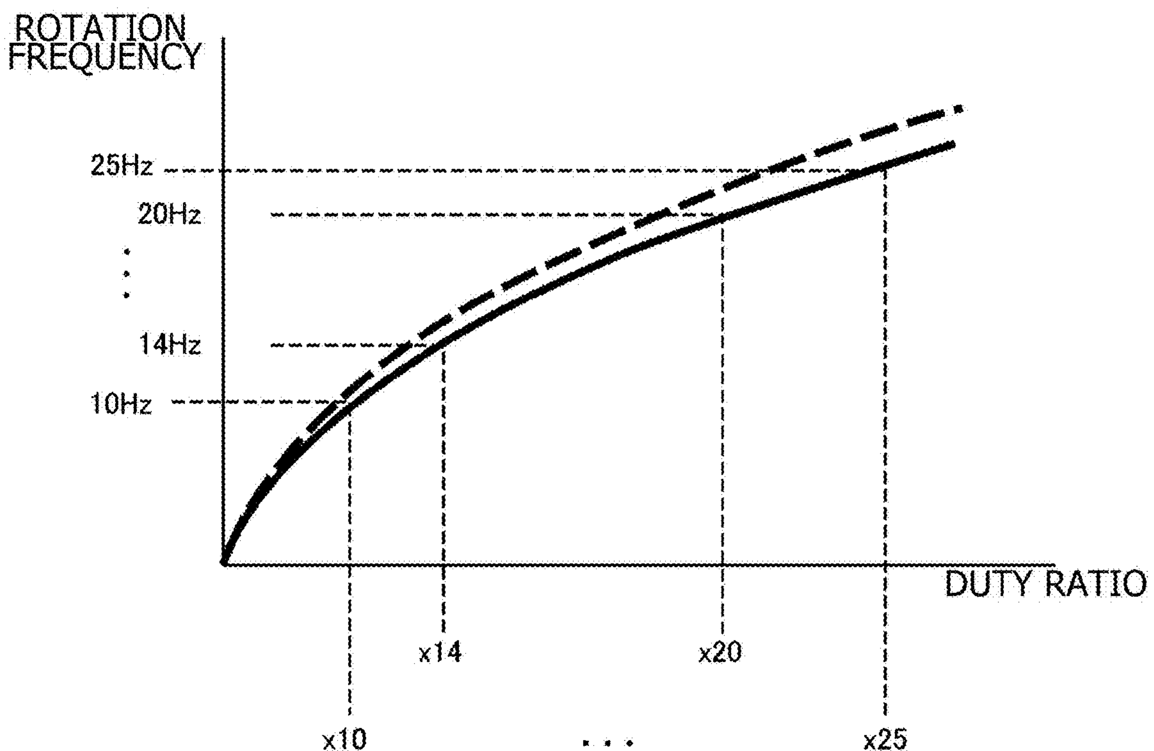
FIG. 10 is a diagram illustrating an approximate curve based on an approximate formula used to determine a duty ratio according to the present embodiment.

Now, an example of a method for determining the duty ratio of the second drive signal DP2 for each DC motor 423 will be described. FIG. 10 is a diagram illustrating an approximate curve based on an approximate formula used to determine the duty ratio according to the present embodiment. The vertical axis of FIG. 10 indicates the rotation frequency, and the horizontal axis of FIG. 10 indicates the duty ratio of the second drive signal DP2. In FIG. 10, for example, "x14" indicates a duty ratio required to obtain a rotation frequency of 14 [Hz]. Note that, although illustration and description are omitted, the duty ratio for the fourth drive signal DP4 illustrated in FIG. 7 may also be determined by a similar method.

As described above, since the DC motor 423 has an individual difference, the duty ratio for the second drive signal DP2 output in the stable period T2 needs to be predetermined for each DC motor 423 according to the individual difference. For example, determination of the duty ratio for the target rotational frequencies of 10 to 25 [Hz] needs 16 adjustment operations and is less productive. The adjustment operation is an operation of determining a duty ratio corresponding to the individual difference for each target rotation frequency.

Additionally, a large number of adjustment operations according to the number of target rotation frequencies increases the drive time for the DC motor 423 in the adjustment operations. Rotation of a new or unused DC motor 423 makes the rotation shaft 421 fit in the DC motor 423, changing rotation performance during the adjustment operation. Accordingly, there is a possibility that much time required for the adjustment operation prevents precise adjustment.

Accordingly, in the present embodiment, by using an approximate formula to determine the duty ratio for each target rotation frequency, a burden on the adjustment operation is alleviated. Specifically, as illustrated in FIG. 10, for example, the appropriate duty ratio is first determined for each of the target rotation frequency of 14 [Hz] and the target rotation frequency of 20 [Hz]. Then, an approximate formula is generated on the basis of two determined pieces of information. Subsequently, an error is determined between a curve (dashed line illustrated in FIG. 10) based on a relational formula pre-generated according to the ideal performance of the DC motor 423 and an approximate curve (solid line illustrated in FIG. 10) based on the generated approximate formula. In a case where the error is within an acceptable range, the appropriate duty ratio may be determined for the target rotational frequencies other than 14 [Hz] and 20 [Hz] on the basis of the generated approximate formula. Note that generation of an approximate formula and determination of an error may be executed by a general-purpose computer or the like, not illustrated.

Employment of the method for determining the duty ratio as described above enables improvement of productivity and adjustment accuracy.

The invention claimed is:

1. A drive control system comprising:

a memory comprising computer-executable instructions; and a processor configured to access the memory and execute the computer-executable instructions to perform operations comprising:

outputting, to a vibration motor of a head-mounted electronic device, during a first time period, a first drive signal at a first voltage V1 to cause the vibration motor to be driven by a first drive force;

after the first time period, outputting, to the vibration motor, during a second time period, a second drive signal at the first voltage V1 to drive the vibration motor by a second drive force smaller than the first drive force, wherein the second drive force includes a plurality of single pulses to be intermittently output;

outputting, to the vibration motor, a brake signal causing generation of brake force that brakes driving of the vibration motor; and while the brake signal is being outputted, outputting, a plurality of drive instructions to a motor control section, wherein each drive instruction is an instruction to the motor control section to output a drive signal to cause the vibration motor to move.

2. The drive control system of claim 1, wherein:
outputting the first drive signal includes outputting the first drive signal to cause the vibration motor to be driven by the first drive force such that the vibration motor vibrates at a target frequency at an end of the first time period; and
outputting the second drive signal includes outputting the second drive signal to cause the vibration motor to be driven by the second drive force such that the vibration motor vibrates at the target frequency during the second time period.

3. The drive control system of claim 1, wherein:
outputting the brake signal includes outputting the brake signal before the first time period; and
outputting the first drive signal includes outputting the first drive signal in response to the head-mounted electronic device displaying a video.

4. The drive control system of claim 3,
wherein:
outputting the brake signal includes outputting the brake signal during a third time period; and
the head-mounted electronic device is displaying a video during the third time period; and
the memory comprises additional computer-executable instructions and the processor is further configured to access the memory and execute the additional computer-executable instructions to perform additional operations comprising:
determining that the video is associated with the plurality of drive instructions; and
outputting, to the vibration motor, a most recent drive signal associated with a most recent drive instruction of the plurality of drive instructions.

5. The drive control system of claim 1, wherein the vibration motor includes a rotation shaft extending in a direction along a display surface of a display panel of the head-mounted electronic device and a spindle rotating with the rotation shaft.

6. The drive control system of claim 1, wherein the first drive signal is a DC signal.

7. The drive control system of claim 1, wherein the second drive signal is a DC signal.

8. The drive control system of claim 7, wherein the second drive signal is pulse-width-modulated.

9. The drive control system of claim 2, wherein the first time period is preset according to the target frequency.

10. The drive control system of claim 1, wherein the memory comprises additional computer-executable instructions and the processor is further configured to access the memory and execute the additional computer-executable instructions to perform additional operations comprising, after outputting the brake signal, causing the vibration motor to move according to a most recent drive instruction of the plurality of drive instructions.

11. A drive control method comprising:
outputting, by one or more processors to a vibration motor of a head-mounted electronic device, during a first time period, a first drive signal at a first voltage V1 to cause the vibration motor to be driven by a first drive force;
after the first time period, outputting, by the one or more processors to the vibration motor, during a second time period, a second drive signal at the first voltage V1 to drive the vibration motor by a second drive force smaller than the first drive force, wherein the second drive force includes a plurality of single pulses to be intermittently output;
outputting, to the vibration motor, a brake signal causing generation of brake force that brakes driving of the vibration motor; and
while the brake signal is being outputted, outputting, a plurality of drive instructions to a motor control section, wherein each drive instruction is an instruction to the motor control section to output a drive signal to cause the vibration motor to move.

12. The drive control method of claim 11, wherein:
outputting the first drive signal includes outputting the first drive signal to cause the vibration motor to be driven by the first drive force such that the vibration motor vibrates at a target frequency at an end of the first time period; and
outputting the second drive signal includes outputting the second drive signal to cause the vibration motor to be driven by the second drive force such that the vibration motor vibrates at the target frequency during the second time period.

13. The drive control method of claim 11, wherein:
outputting the brake signal includes outputting the brake signal before the first time period; and
outputting the first drive signal includes outputting the first drive signal in response to the head-mounted electronic device displaying a video.

14. The drive control method of claim 13,
wherein:
outputting the brake signal includes outputting the brake signal during a third time period; and
the head-mounted electronic device is displaying a video during the third time period; and
the drive control method further comprises:
determining that the video is associated with the plurality of drive instructions; and
outputting, to the vibration motor, a most recent drive signal associated with a most recent drive instruction of the plurality of drive instructions.

15. The drive control method of claim 11, further comprising, after outputting the brake signal, causing the vibration motor to move according to a most recent drive instruction of the plurality of drive instructions.

16. One or more non-transitory computer-readable media comprising computer-executable instructions that, when executed by one or more processors of an electronic device, cause the electronic device to perform operations comprising:
outputting, by one or more processors to a vibration motor of a head-mounted electronic device, during a first time period, a first drive signal at a first voltage V1 to cause the vibration motor to be driven by a first drive force;
after the first time period, outputting, by the one or more processors to the vibration motor, during a second time period, a second drive signal at the first voltage V1 to drive the vibration motor by a second drive force smaller than the first drive force, wherein the second drive force includes a plurality of single pulses to be intermittently output;
outputting, to the vibration motor, a brake signal causing generation of brake force that brakes driving of the vibration motor; and
while the brake signal is being outputted, outputting, a plurality of drive instructions to a motor control section, wherein each drive instruction is an instruction to the motor control section to output a drive signal to cause the vibration motor to move.

17. The one or more non-transitory computer-readable media of claim 16, wherein:

outputting the first drive signal includes outputting the first drive signal to cause the vibration motor to be driven by the first drive force such that the vibration motor vibrates at a target frequency at an end of the first time period; and outputting the second drive signal includes outputting the second drive signal to cause the vibration motor to be driven by the second drive force such that the vibration motor vibrates at the target frequency during the second time period.

18. The one or more non-transitory computer-readable media of claim 16, wherein:

outputting the brake signal includes outputting the brake signal before the first time period; and outputting the first drive signal includes outputting the first drive signal in response to the head-mounted electronic device displaying a video.

19. The one or more non-transitory computer-readable media of claim 17, wherein:

outputting the brake signal includes outputting the brake signal during a third time period; and the head-mounted electronic device is displaying a video during the third time period; and the one or more non-transitory computer-readable media further comprises additional computer-executable instructions that, when executed by the one or more processors, cause the electronic device to perform additional operations comprising:

determining that the video is associated with the plurality of drive instructions; and outputting, to the vibration motor, a most recent drive signal associated with a most recent drive instruction of the plurality of drive instructions.

20. The one or more non-transitory computer-readable media of claim 16, wherein the one or more non-transitory computer-readable media further comprises additional computer-executable instructions that, when executed by the one or more processors, cause the electronic device to perform additional operations comprising, after outputting the brake signal, causing the vibration motor to move according to a most recent drive instruction of the plurality of drive instructions.

* * * * *